US010430390B1

(12) United States Patent
McCoy et al.

(10) Patent No.: US 10,430,390 B1
(45) Date of Patent: Oct. 1, 2019

(54) METHOD AND SYSTEM FOR MANAGING MUTUAL DISTRIBUTED LEDGERS IN A SYSTEM OF INTERCONNECTED DEVICES

(71) Applicant: OmniMesh Technologies, Inc., Syracuse, NY (US)

(72) Inventors: Joseph R. McCoy, Frankfort, NY (US); William Abrams, East Syracuse, NY (US); Brian Cavanagh, Manlius, NY (US)

(73) Assignee: OmniMesh Technologies, Inc., Syracuse, NY (US)

( * ) Notice: Subject to any disclaimer, the term of this patent is extended or adjusted under 35 U.S.C. 154(b) by 0 days.

(21) Appl. No.: 16/123,003

(22) Filed: Sep. 6, 2018

(51) Int. Cl.
| G06F 17/30 | (2006.01) |
| G06F 16/182 | (2019.01) |
| H04W 80/12 | (2009.01) |
| H04L 29/08 | (2006.01) |
| G06F 16/27 | (2019.01) |
| G06F 16/18 | (2019.01) |
| H04W 84/12 | (2009.01) |

(52) U.S. Cl.
CPC ...... *G06F 16/1834* (2019.01); *G06F 16/1805* (2019.01); *G06F 16/27* (2019.01); *H04L 67/322* (2013.01); *H04W 80/12* (2013.01); H04L 67/16 (2013.01); H04W 84/12 (2013.01)

(58) Field of Classification Search
CPC ......... G06F 17/30206; G06F 17/30185; G06F 17/30283; G06F 16/1834; G06F 16/1805; G06F 16/27; H04W 80/12; H04W 84/12; H04L 67/16; H04L 67/322
See application file for complete search history.

(56) References Cited

U.S. PATENT DOCUMENTS

| 6,765,916 | B1 | 7/2004 | Duvvuru et al. |
| 7,711,865 | B2 | 5/2010 | Kim et al. |
| 9,749,140 | B2 | 8/2017 | Oberhauser et al. |
| 9,794,074 | B2 | 10/2017 | Toll et al. |
| 2008/0082374 | A1 | 4/2008 | Kennis et al. |

(Continued)

OTHER PUBLICATIONS

Dittrich K.R. et al., The active database management system manifesto: A rulebase of ADBMS features, International Workshop on Rules in Database Systems, RIDS 1995: Rules in Database Systems, pp. 1-17.

(Continued)

*Primary Examiner* — Greta L Robinson
(74) *Attorney, Agent, or Firm* — Fox Rothschild LLP

(57) ABSTRACT

When a local server that is connected to a wireless local area network (WLAN) receives a service request from a first electronic device, the server identifies a resource to provide one or more elements of the service. The server assigns the resource to provide the service element(s). The local server also selects one or more mutual distributed ledgers (MDLs) having parameters that correspond to the service request. The local server generates and transmits, to a gateway server, a transaction record having a format that corresponds to the selected MDL. This enables the local server to facilitate the delivery of services such as spectrum sharing, content streaming, and the like using WLAN-connected devices to facilitate delivery of the service. It also enables the gateway server to update each selected MDL with a transaction ledger that follows each selected MDL's format.

22 Claims, 7 Drawing Sheets

(56) References Cited

U.S. PATENT DOCUMENTS

| | | | |
|---|---|---|---|
| 2009/0327303 A1 | 12/2009 | Ootjers et al. | |
| 2016/0078566 A1* | 3/2016 | Farrell | G06Q 40/12 705/30 |
| 2017/0132625 A1 | 5/2017 | Kennedy | |
| 2017/0180211 A1 | 6/2017 | Johnson | |
| 2017/0236094 A1* | 8/2017 | Shah | G06Q 10/063 705/300 |
| 2017/0236102 A1 | 8/2017 | Biton | |
| 2018/0232693 A1* | 8/2018 | Gillen | G06Q 10/0834 |
| 2018/0253452 A1* | 9/2018 | Callan | G06F 17/30575 |
| 2018/0254982 A1* | 9/2018 | Apostolopoulos | H04L 45/302 |
| 2018/0285810 A1* | 10/2018 | Ramachandran | G06Q 10/087 |

OTHER PUBLICATIONS

Cooklev T. et al., "A Comprehensive and Hierarchical Ontology for Wireless Systems", Indiana University—Purdue University Fort Wayne, Opus: Research & Creativity at IPFW, May 2014.

Hileman G. et al., "Global Blockchain Benchmarking Study", Cambridge Centre for Alternative Finance, Cambridge, UK, 2017.

Kim H. et al., "Towards an Ontology-Driven Blockchain Design for Supply Chain Provenance", Aug. 23, 2016.

Mainelli M. et al., Sharing ledgers for sharing economies: an exploration of mutual distributed ledgers (aka blockchain technology), EY Global Financial Services Institute, Winter 2015, vol. 3, Issue 3.

* cited by examiner

METHOD AND SYSTEM FOR MANAGING MUTUAL DISTRIBUTED LEDGERS IN A SYSTEM OF INTERCONNECTED DEVICES

BACKGROUND

The Internet of Things (IoT) edge base and local heterogeneous network environments are rapidly expanding. With this expansion comes an increased risk of network infrastructure security breaches. Much of the nefarious activity that threatens individual Internet users, enterprise operations and transaction viability has arisen in part due to the lack of accountability and authentication foresight during the conception and deployment of the original Internet core technological standards and the Internet's basic structure. However, even with a grave potential for damage, robust solutions to a complex system remain reactionary and often lengthy in discovery. The diverse nature of the vulnerability surface that enables such malicious activity is compounded by the connections (endpoints referred to as "machines"), as well as the variety of software applications that are allowed access to network and or cloud computing resources. With the advent of the IoT enabling many more billions of connections, plus even remote standalone local network "clouds," the potential vulnerability compounds many times over.

Distributed digital ledger technologies (such as an encrypted blockchain) have been proven as robust solutions for authentication and accountability, as they provide a fully auditable trail of transactions between peers and community maintained. A problem is that to date, distributed ledger technologies remain application specific, with the intended use of the technology (e.g., monetary transaction, data distribution, document store, etc.) known as part of the inclusion process into a specific chain or side chain.

This document describes methods and systems that address at least some of the issues described above.

SUMMARY

In various embodiments, a method of managing requests on a wireless local area network, includes, by a local server that is communicatively connected to a wireless local area network (WLAN), wherein the WLAN is in communication with wireless electronic devices of a plurality of types: (1) receiving a service request from a first electronic device, wherein the first electronic device is one of the wireless electronic devices that is connected to the WLAN, and the first electronic device corresponds to a first one of the types; (2) parsing the service request to identify one or more service elements that are needed to fulfill the service request; (3) using a resource ontology to identify a second electronic device that can provide at least one of the service elements, wherein the second electronic device corresponds to a second one of the types; (4) transmitting an assignment to the second electronic device to provide the at least one of the service elements; (5) generating a transaction record that includes a record of the service request; (6) accessing a data store comprising an ontology for a plurality of a mutual distributed ledgers (MDLs), and selecting from the data store a MDL that corresponds to the service request or to an identified service element; (7) accessing or generating an MDL ontology that identifies one or more MDLs, or characters of MDLs, that correspond to the requesting entity and the service provider; (8) transmitting, to a gateway server, a transaction record along with the MDL ontology. In some embodiments, the method also may include, by the gateway server: (1) using the MDL ontology to identify a remote MDL; and (2) using the transaction record to generate a transaction ledger for the identified service element, wherein the transaction ledger has a format that corresponds to formatting requirements of the identified remote MDL. The gateway server may transmit the transaction ledger to the remote MDL.

In various embodiments service requests are managed on a wireless local area network by a local server and a gateway server. The local server is communicatively connected to a wireless local area network (WLAN) that serves as a service platform and that is connected to resources that include various types of electronic devices. When the local server receives a service request from a first wireless electronic device that is connected to the WLAN, it will parse the service request to identify one or more service elements that are needed to fulfill the service request. The local server will use a local resource ontology to select, from among the resources that are connected to the WLAN, a resource electronic device that is capable of providing one or more of the service elements. The local server will transmit an assignment to the resource electronic device to provide those service element(s), and it will generate a transaction record for the service request.

The local server will generate one or more MDL ontologies for one or more MDLs associated with those resources involved with the service. The local server will pass the transaction record(s) and MDL ontology to the gateway server. For each service element (or a group service elements), the local server will match the service request, service elements and operational monitoring requirement to select from the data store a MDL that corresponds to the service element. Upon determining that the resource has provided the service element(s), whether by notification from the resource or by notification from the local server, the gateway server will use the MDL ontology to identify, for each service element, a remote MDL that corresponds to the MDL. The gateway server also will identify formatting requirements for the identified remote MDL, and it will use the transaction record(s) to generate transaction ledger(s) that meet the remote MDL's formatting requirements. The gateway server may then transmit the transaction ledger(s) to the remote MDL(s).

Optionally, when the gateway server identifies a remote MDL, it may identify a MDL that is associated with the resource electronic device, a MDL that is associated with the first (requesting) electronic device, or it may identify MDLs for both devices.

Optionally, the gateway server may identify a second remote MDL that is associated with the one of the devices involved in the transaction. The gateway server may identify a second remote MDL that is associated with the additional device, and it may generate a second transaction ledger for the service request according to formatting requirements of the second remote MDL, and it may transmit the second transaction ledger to the second remote MDL.

Optionally, the resource electronic device may provide the service element(s) to the first electronic device to provide the service, and it may transmit a transaction confirmation to the gateway server. The gateway server may then generate the transaction ledger in accordance with the remote MDL's formatting requirements. Alternatively, the local server may receive the service element(s) from one or more resource electronic device(s). If so, the local server may pass the service element(s) to the first electronic device. Alternatively, the local server may confirm that the one or more resource electronic device(s) has provided the service element(s). The local server may transmit one or more transaction confirmations to the gateway server with the transaction record.

Optionally, the resource electronic device may be a second wireless electronic device that is connected to the WLAN, or it may be a component of the WLAN itself.

Optionally, when generating a transaction ledger, the gateway server may generate a permissioned distributed ledger element that includes a resource ID for the resource electronic device, along with one or more of the following: a measurement of an amount of utilization of the resource electronic device, or a quality of service metric.

Optionally, if the gateway server determines that the assigned resource will not perform a service element, it may command the local server to reassign that service element to a different resource.

DETAILED DESCRIPTION

Figure 1:
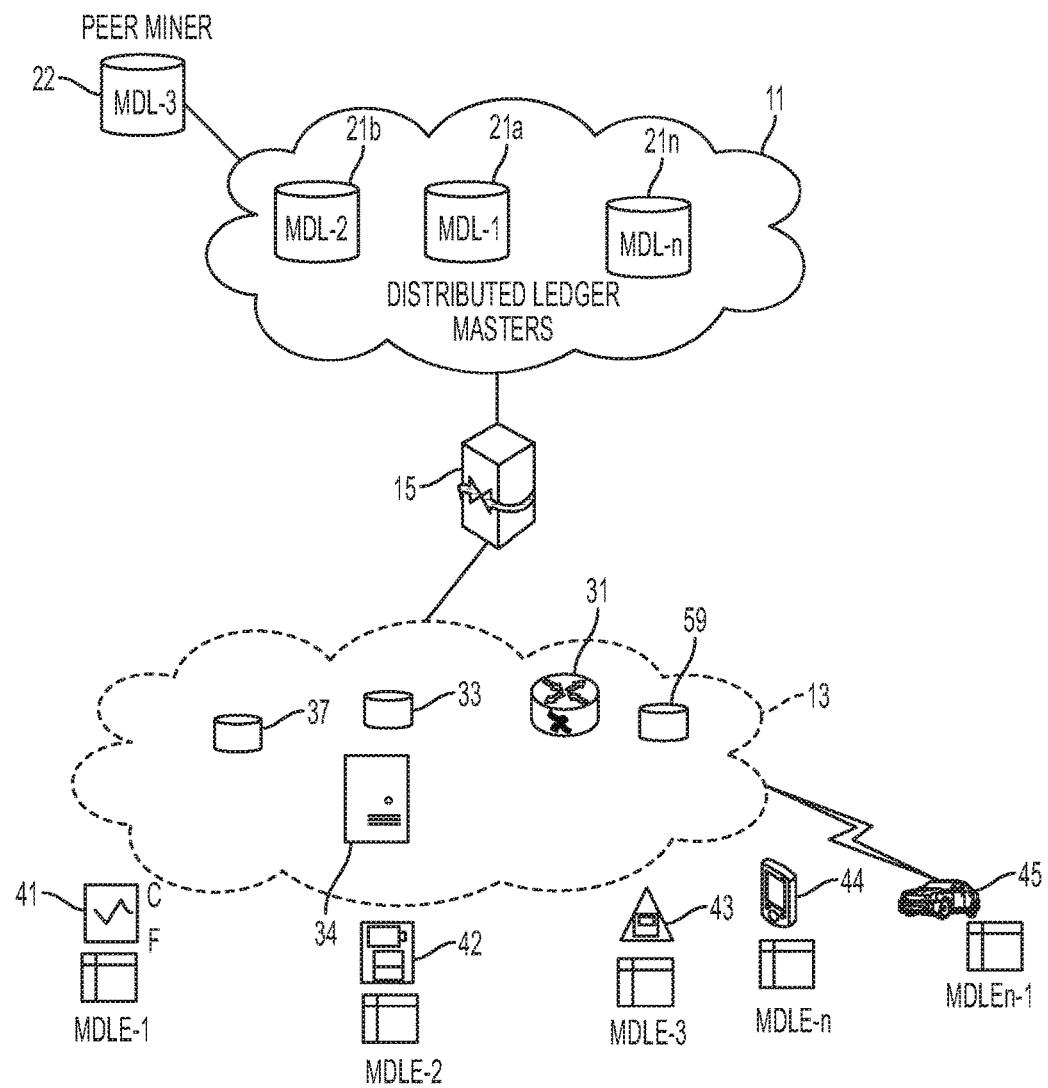
FIG. 1 provides an overview of an example of a system that may be used in various embodiments.

Terminology that is relevant to this disclosure includes:

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. This document may refer to electronic devices that are connected in an IoT arrangement as "IoT devices." Electronic devices also may include components of vehicles such as dashboard entertainment and navigation systems, as well as on-board vehicle diagnostic and operation systems, each of which also may be considered to be an IoT device. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion below, a client device, server device, virtual machine or container may be referred to simply as a "device" for brevity. Additional elements that may be included in electronic devices will be discussed below in the context of FIG. 7.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

This document describes a system that may enable large scale heterogeneous peer based accountability and policing, and that may afford a scalable and low computational cost burden. It can use distributed digital ledger technologies (such as encrypted blockchain) to yield a fully auditable trail of transactions between peers and community. This can help solve technical problem that exists today in that prior art systems have been application specific. In the prior art, transactions typically exist where the form or instance of the blockchain is known by both parties, as well as the intended use (monetary transaction, data distribution, document store, etc.). This is because transactions typically occur within a system that uses a uniform ledger design. The systems described in this document can help in situations where the mechanics of the digital ledger are not known by all parties in advance.

The system provides a means of creating an individual or group specific chain, without prior knowledge of the environment or application, that becomes a mutually distributed digital ledger for the purposes necessary for autonomous mobile-to-mobile (M2M) or mobile peer to peer utilization within edge (last mile) or local (inter communication MANETs) so as to authenticate, record and promote the necessary metadata for audit and accountability. An intelligent system agent that interacts with the network and the peers (inclusive of transient peer) defines a type of mutual distributed ledger (MDL) and information that is promoted beyond the local network and/or recorded into the peer's own MDL such as the case for transient autonomous operations. The agent would hold the ontology for ledger inclusion thereby effecting which ledgers are written to and as a ledger itself, become a record of said instantaneous ledger records.

FIG. 1 provides an overview of an example of a system that may be used in various embodiments. A wireless local area network (WLAN) 13 serves as a service platform and includes a local server 31 and any number of resources of various types, such as one or more data storage facilities 33, one or more servers 34 or other processing devices, or other devices that are in communication with the local server 31. The local server 31 may be an edge server for the service platform 13, in that it serves as the connection between the platform and the remote and gateway elements (described below). The various components of the WLAN serve as the service platform 13 for the services described in this document.

In addition, any number of electronic devices 41-45 with wireless communication capability may be in communication with each other and/or external services via the WLAN/ service platform 13. Examples of such devices include IoT-enabled devices such as an appliance 41, a camera 42, a voice-activated personal digital assistant 43, a mobile phone 44, and/or a smart vehicle 45. When this document indicates that a device is "connected to" the WLAN, it may be referring to a device that is part of the WLAN or an external device that is in communication with the WLAN.

Services that any resource may provide include services such as processing capability, storage, bandwidth, Internet connectivity, or other services.

As will be described in more detail in the context of FIG. 2, the local server 31 of the service platform 13 will serve the function of a MDL interpreter to identify a MDL that is appropriate for a requesting entity to exchange value for the service requested by any of the devices. The local server 31 also may create a record of the exchange between the resource device, such as a record of the service provided to the device, or a record indicating that the device requested a service but did not receive it. The local server 31 also may identify one or more local resources to provide the service. The local resources may include resources of the service platform 13 (such as storage resources 33 and/or processing resources 34), and/or resources that are available from other devices through the service platform such as any of the WLAN-connected devices 41-44.

To select the appropriate MDL and resource, the local server 31 may use data from a relational database 59, which may be in the format of a database or look-up table. For example, the relational database 59 may include information about a variety of connected resources. The database may include a local resource ontology that the local server 31 may use to assign a resource to a requested service. For example, for each of the resources, the database may include a MDL and one or more service capabilities. When the local server 31 receives a service request from a connected device, it may parse the service request to identify various service elements that are needed to provide the service. It may then access the relational database 59 and identify one or more resources that are capable of providing one or more of the service elements, along with each identified resource's associated MDL.

The local server will also generate or access an MDL ontology that associates the requesting device and the resource device with appropriate remote MDLs Alternatively, the local server may include the MDL ontology criteria for selection of remote MDLs that will receive a transaction ledger for the service element. The MDL ontology may include information about permissioned distributed ledgers or other forms of encrypted distributed ledgers, along with data that the gateway server may use to select a remote MDL that corresponds to the service element, the service providing device, and/or the requestor. For example, the MDL ontology may indicate that two possible MDLs correspond to service element, but only one of those two MDLs are used by the service provider. If so, the server that selects the MDL (i.e., the local server or the gateway server) would select the one that is used by the service provider.

The service platform 13 also may include a local MDL element miner 37 that is an electronic device or system that is configured to mine and add blocks to one or more local MDLs. Optionally, the service platform may identify one resource to satisfy the entire service request, or it may identify multiple resources, each of which would provide various service elements of the overall requested service.

A gateway server 15 serves as a gateway between the WLAN 13 and one or more remote systems 11. The gateway server 15 may be part of the WLAN 13, in which case the gateway server 15 and local server 31 may be components of one or more local devices. Alternatively, the gateway server 15 may be external to the WLAN 13 as shown in FIG. 1. As will be described in more detail below, the gateway server 15 may provide the functions of connecting the system to multiple remote blockchains that the system may update. The gateway server also may provide MDL management functions using information (such as the MDL ontology) that the gateway server 15 receives from the local server 31 and/or the WLAN-connected devices 41-45.

The remote system 11 will include computing devices such as servers, communication hardware such as transceivers, and programming instructions that are configured to cause the remote system 11 to save a record of services that are provided to end users via the service platform 13 and/or via other external communicatively-connected systems. The computing devices may store MDLs 21a-21n that the gateway server 15 may access and update as transactions occur between a service requestor and each resource that provides the service. Any of the MDLs 21a-21n may be in communication with a peer miner 22, which is an electronic device or system that is part of a peer-to-peer network of mining nodes that work to add blocks to the MDLs.

Figure 2:
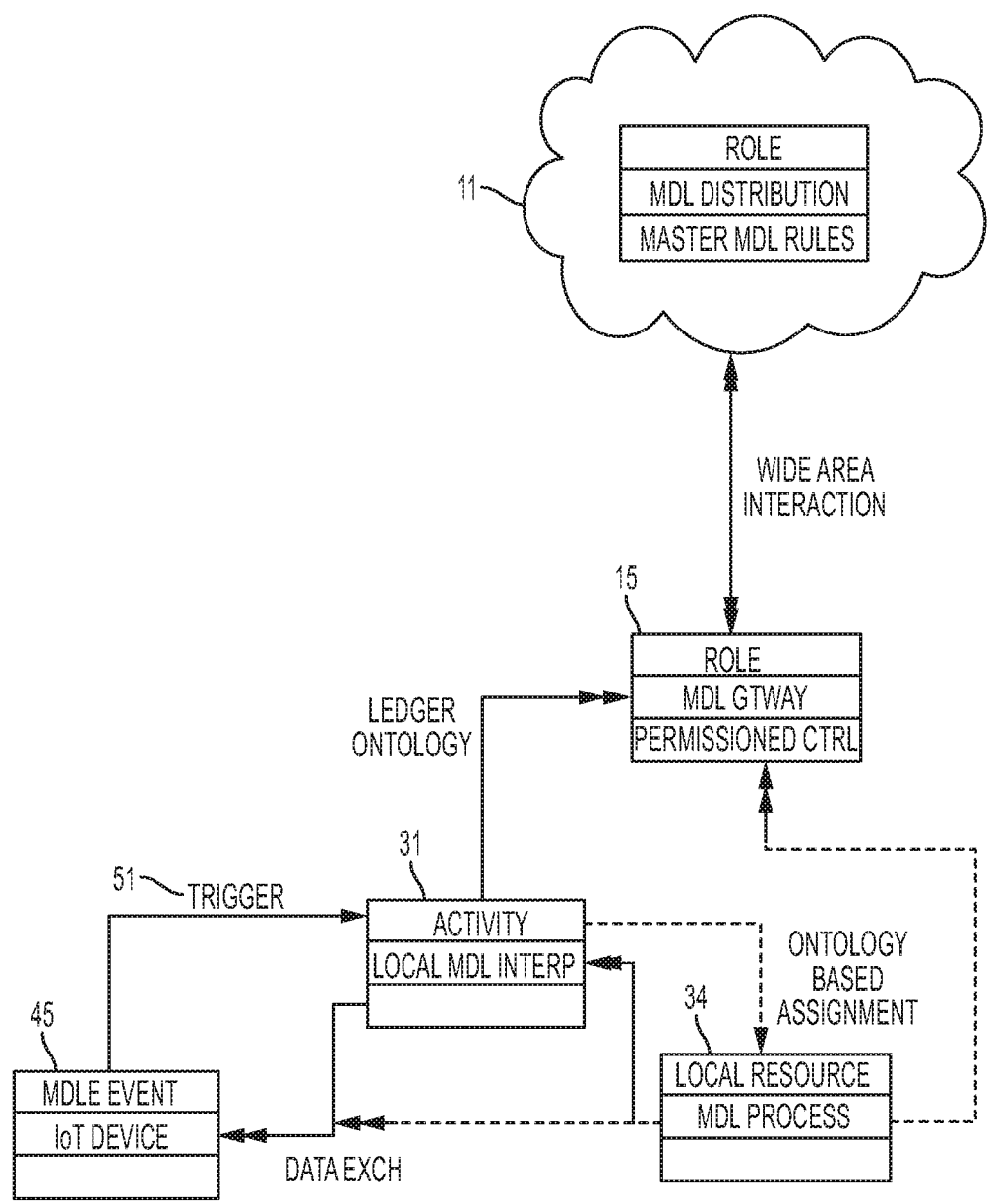
FIG. 2 is a functional diagram showing how certain elements shown in FIG. 1 may operate.

FIG. 2 is a functional diagram showing how certain elements shown in FIG. 1 may operate. In FIG. 1, an IoT device 45 will initiate a trigger, which is a request to transact some form of utilization of one or more resources that are part of, or also in communication with, the WLAN (service platform), such as data storage facility 33, a processing device 34 and/or one of the other connected devices 41-44 in FIG. 1. If the service-providing device is external to the WLAN, it may have engaged in a handshake with the local server 31 in which the external device informed the WLAN of the service that it is available to provide, or it may be a subscribed device, or it may have otherwise made itself known to the local server 31. For example, a processing device 34 may be the resource that provides a service element, for example download of video content, and if so then in order to be selected it must have informed the local server 31 of its availability to provide this service element. The local server 31 may share this information with a Federated Resource Manager of the gateway server 15, which will be described below.

The requesting IoT device 45 may send the trigger to the local server 31, which functions as a local MDL interpreter, the functions of which will be described in more detail in FIG. 3. The communicative connection between the requesting IoT device 45 and local server 31 may be wired or wireless, and in this example we use a wireless communication link. As mentioned in the discussion of FIG. 1 above, the local server 31 may use a local resource ontology to assign a resource 34 to perform the service element. The local server 31 will also transmit a record of the trigger (i.e., of the service request) to the gateway server 15. The resource 34 will provide the service element to the requesting device 45, and it may inform the local server 31 and/or the gateway server 15 when this is complete. Alternatively, the resource 34 may provide the service element to the local server 31, which may pass the service element to the requesting device and generate a record of the transaction when complete, or at any point before, during or after provision of the service element. If multiple resources provide multiple service elements, they may each provide their respective service elements directly to the requesting device, or the local server 31 may receive each service element and combine the service elements to provide the service to the requesting device. The local server 31 may generate additional transaction records for each service element, and it may pass those transaction records along to the gateway server 15 as the service elements are assigned and/or completed. If the service elements are assigned to multiple resources, the local server may provide the gateway server 15 with MDL ontologies for each service element so that the gateway server may use each MDL ontology to identify appropriate remote MDLs for the parties that provided or received each service element in the overall service request.

Upon receipt of a transaction record and an MDL ontology, the gateway server 15 may identify one more remote MDLs that are to receive transaction ledgers for one or more of the service elements, and it may generate those transaction ledgers in accordance with each remote MDL's formatting requirements. The gateway server 15 will use the MDL ontology to identify the remote MDLs. For example MDL ontology may specify the MDLs that are associated with the requesting entity and the service providing resource. Or, it may include multiple candidate MDLs from which the gateway server may select. Or, it may include characteristics of the MDL, and the gateway server may identify and select remote MDLs having those characteristics. These functions will be described in more detail below.

Figure 3:
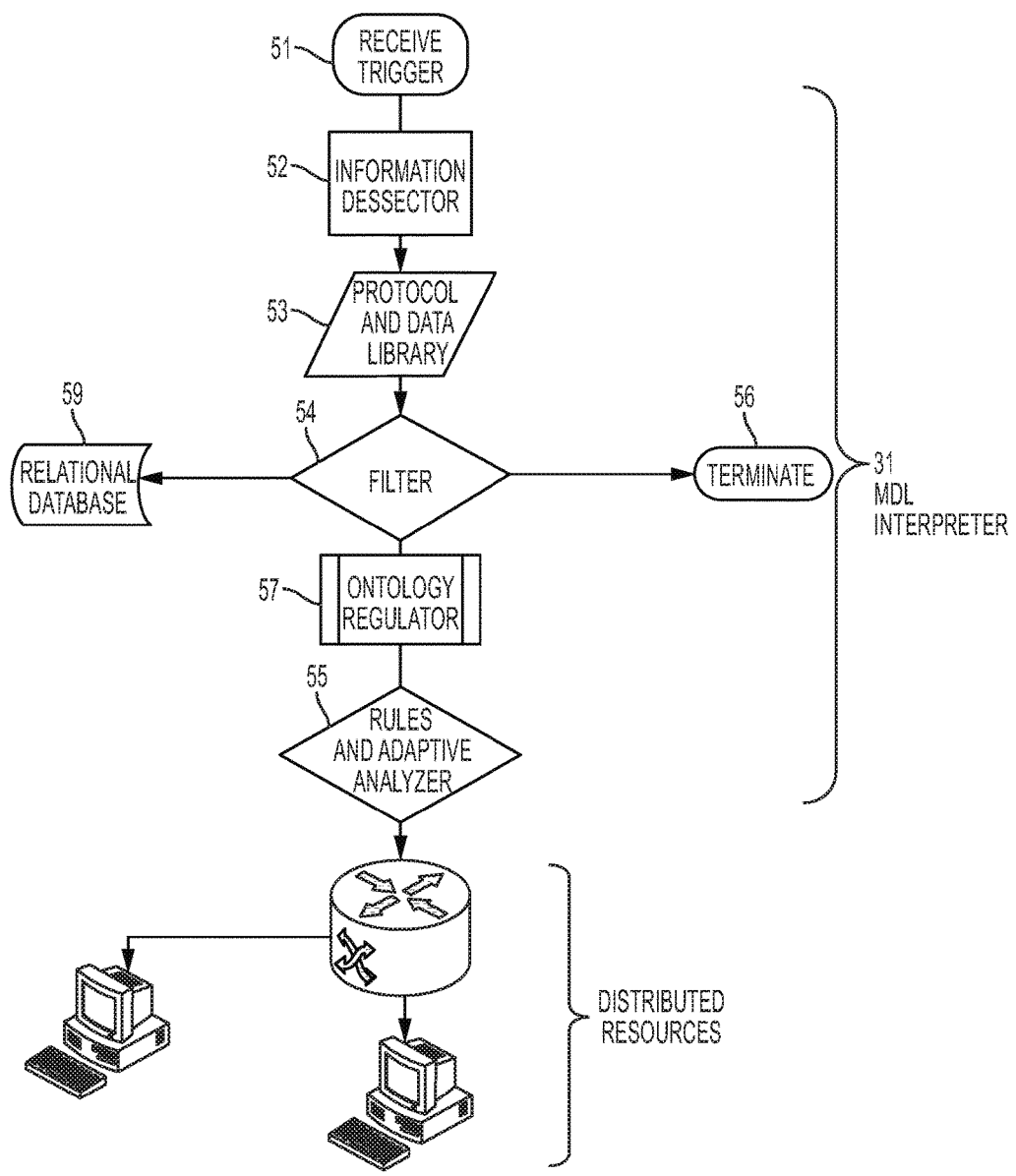
FIG. 3 is a diagram illustrating functions that a mutual distributed ledger interpreter server of a local network may perform.

FIG. 3 illustrates a process that the MDL interpreter (local server 31 of FIG. 2) may follow upon receipt of a trigger 51. Information Dissector 52 refers to a set of programming instructions that enable the local (MDL interpreter) server 31 to determine, in this instance in near real time, information that would instruct a software defined radio of the system to exchange necessary data for authentication. The information may include analysis of the packets received to determine a communications protocol with which the information packets have been provided (e.g., IEEE 802.11, 4G LTE). The software defined radio may select, based on a look-up table, algorithm, or matching process, communication parameters (frequency, protocol and/or waveform) that are consistent with the determined communication parameters, and it will adjust its operation to receive and process the received information packets in accordance with the determined communication parameters. The communication parameters may include those necessary to establish communication on an adaptable system and record transaction records to an appropriate MDL. The Information Dissector may thus provide a handshake between the WLAN and the IoT device to establish a mode of communication to support the IoT device that provided the trigger.

Authentication may encompass authentication of the person who is using a device, authentication of an IoT device (or a software agent), or authentication of both a person and a device or software agent. For the purpose of this discussion this document will interchangeably use the term "user" to refer to a person, device or agent that is using the system. Users may be pre-registered in the system and have an associated wallet that is used to pay for transactions. (As used in this document, the term "wallet" is intended to cover any digital ledger construct that operates to provide digital payment or value exchange, such as a cryptocurrency wallet, a permissioned ledger, etc.) Users that are pre-registered also may be associated with one or more user accounts. Some users may be unknown in that they have not been pre-registered in the system. Such users may be permitted to access a subset of network services until the system has verified that they have provided a valid means for paying for service, and also that the means of payment is a form of payment that the system is able to accept (for example, until the user's wallet has been verified). Authentication may be done by checking information received from a user against data in a look-up table of verified users, or by some other means.

The information dissector 52 also includes programming instructions that cause the MDL interpreter server 31 to parse data elements of the trigger to establish the type of service requested, and also to identify the user or device that initiated the trigger. The Information Dissector 52 also establishes a virtual wallet for the user as either the wallet associated with a pre-registered user, or a wallet that is provided by an unknown user and verified by the Information Dissector. The Information Dissector then records the device, requested service, an identifier and type for the user's virtual wallet, and all information needed to communicate with the IoT device or agent in a protocol and data library 53. This library may include temporary storage used to manage "sessions" within the network.

The Adaptive Analyzer 55 is a set of programming instructions that will use information parsed by the MDL interpreter server and/or other elements of the transaction to establish a ledger to record the transaction (notational ledger ontology). The exchange of "rules" for Services are based on the Adaptive Analyzer which is based on a deterministic machine learning function that assigns and prioritizes the network resources against service (application) requirements. This may include a pricing function in which the "Ask" price range of the service request is compared against the "bid" price range of local service providers (i.e., local resources) to locate a local service provider who will fulfill the request at the lowest cost.

The adaptive analyzer 55 also includes rules and/or machine learning tools to understand the parameters affecting quality of service for the requested service (such as latency or bandwidth) and set service priority accordingly. It then performs an ontology-based assignment of resources based on the requested service type and the availability of local resources to fulfill the service.

Optionally, before reaching the adaptive analyzer, a filter 54 may include programming instructions with a set of rules pursuant to which the MDL interpreter server 31 ultimately performs a Go/No-Go decision that enables the service request to complete, or to be rejected or redirected. The rules may vary depending on the application. For example, a service request may not be accepted if authentication fails; if the wallet is invalid or contains insufficient funds or other indicia of value; if the "bid" price of all local resources exceeds the maximum "ask" price of the requested service; if the service request is invalid within the local network; or if there is no available local resource to process the service request.

Optionally, if the filter 54 determines that a request should be rejected, the filter 54 may send the request to a termination module 56, which includes a set of rules that may either end the request or that may direct the request to an outside service which may provide and/or perform actions that are outside the transacting authority of the local service network (WLAN 13). Termination may terminate the request process, or it may involve handing off the request to a different service for further analysis.

In the event that the filter 54 function accepts the service request and assignment, an ontology regulator 57 may provide rules that enable the MDL interpreter server 31 to communicate with a MDL gateway server (15 in FIG. 2) to record wallet identification and type information for the user, as well as a record of the transaction, which may be for example in a local permissioned distributed ledger element for purposes of local resource tracking and management. The record information in the transaction record may include information about the transaction, such as a measurement of an amount of utilization of the resource (e.g., storage capacity used, bandwidth used, processing time used, etc.), resource ID(s) for the resource(s) that provided or otherwise supported the service, metrics for quality of service assessment (such as response time), and the like. Note that this permissioned distributed ledger element may or may not follow the blockchain formatting requirements of the service requestor. For example, this ledger may comply with a ledger template of the service platform, of the service provider, or of an external MDL host. The permissioned distributed ledger element, for this embodiment, may allow for the spawning of other permissioned distributed ledger elements that the user (such as IoT device 45 in FIG. 2) that requests the service may need for embedded service utilization and to ensure that all parties receive a record of the transaction using a MDL that is appropriate to their individual requirements. The local sever may use or generate an MDL ontology identifying particular MDLs that could be made aware of the transaction and/or characteristics of remote MDLs that could be made aware of the transaction. Transaction records may be generated upon assignment of a service element to the resource, while the service element is being performed, or upon completion of the service element, depending on the rules that may apply and/or the requirements of the applicable remote MDL.

The Adaptive Analyzer 55 communicates the assignment to the selected local MDL process device resource or resources (such as data storage facility 33 or IoT device 44 in FIG. 1) and provides each selected resource with the information needed to communicate with the IoT device 45 that requested the service. The Adaptive Analyzer will also enable the local server 31 to record one or more ledger entries for the service to indicate that a service transaction has occurred or will occur. Transaction records may be generated upon assignment of a service element to the resource, while the service element is being performed, or upon completion of the service element, depending on the rules that may apply and/or the requirements of the applicable remote MDL. The local server 31 also communicates with the local MDL process device (e.g., 33, 34 or 44), the IoT device 45 and the MDL gateway server 15 as needed to fulfill the request.

Continuing with reference to FIG. 2, the MDL gateway server 15 may include a semantic interpretation module as part of a federated resource manager, within which there is resource monitoring visibility across the WLAN 13 service platform, as well as any connected IoT devices that the service platform has determined are capable of providing a service. This interpretation module is provided with the notional ledger ontology that was brokered in the exchange (Ontology Based Assignment, indicated in FIG. 2) and described further, maintains the operational control of the building of all ledger transactions in coordination with distributed resources (e.g., 33, 34 and/or 41-45 in FIG. 1). In some instances the integration of Application Performance Monitoring for Network Function Virtualization "Like" features allows for the novel redirection of the service platform's 13 resources based upon ledger cueing of application assigned priorities. In other words, prior to actually writing transactions to a remote MDL, the gateway server may accumulate transaction records in memory and generate the ledger for the transaction until a higher priority service element has been provided and its transaction ledger written to the remote MDL. The local server may similarly accumulate transaction records and send them to the gateway server based on assigned priorities. Such priorities may be set initially by the MDL interpreter server 31. The adaptive analyzer module 55 is then later controlled by the MDL gateway server 15 utilizing the Semantic Ontology Follower algorithm. It is in this fashion that the system described in this document supports multiple types of MDLs, which are interpreted and incorporated as part of an automated transaction prioritization record for priority. The MDL gateway server 15 is not limited to any particular or proprietary ledger protocol, but instead supports multiple types of ledger protocols.

Figure 4:
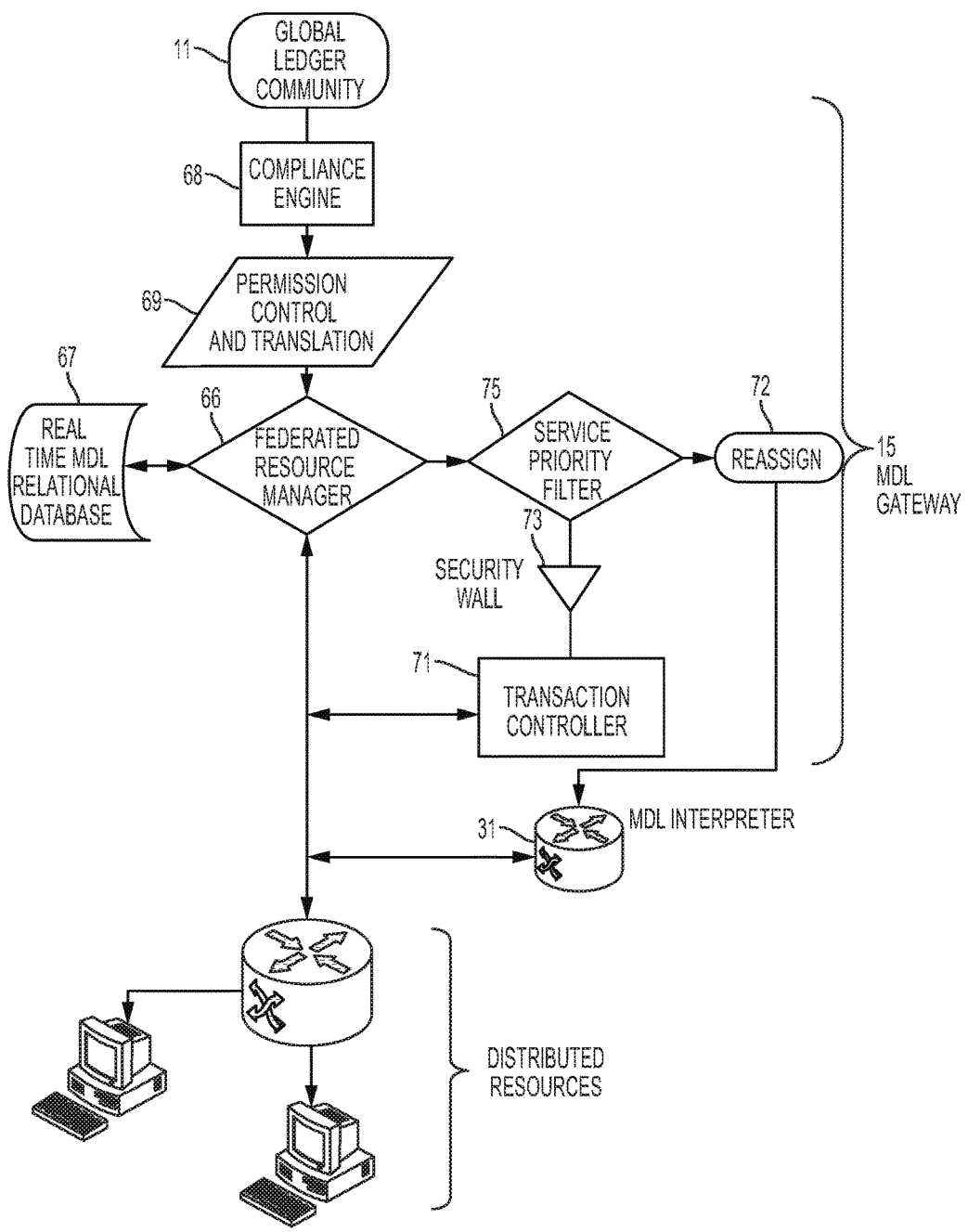
FIG. 4 is a diagram illustrating functions that a gateway server between a local network and external networks may perform.

As described above, FIG. 3 explains various functions of the MDL interpreter 31. FIG. 4 similarly expands various functions of the gateway server 15.

FIG. 4 is a block diagram of certain modules that the gateway server 15 may implement. In its role it may act as a MDL requirements broker so that the local MDL interpreter server 31 may be provided the information necessary to generate or update the MDL ontologies, and to interact with devices in direct process of MDL updates if the MDL protocol does not require further distribution and ledger update (blockchain mining depicted in FIG. 1). Or, the gateway server may take a more controlling role which address multiple types or instances of resource exchange to complete the services being transacted. In particular, the gateway server may act as a federated resource manager 66 to ensure that services are performed to achieve the requested result, and that the appropriate MDL(s) are updated. It may also include a compliance module 68 configured to ensure that external MDLs of the global ledger community (which may include the remote system 11) receive updates that are compliant with each MDL's formatting and other requirements. In such a case, the gateway server 15 may not only provide the MDLs of the global ledger community 11 with MDL information prepared according to rules and parameters found in, for example, the protocol and data library (53 of FIG. 3) and a MDL relational database 67, but it would also keep the adaptive analyzer 55 of the MDL interpreter 31 (see FIG. 3) updated on resource status for those resources that involved in the service transaction.

MDL protocol, rules and policy for generally practiced MDLs may be obtained by participation at the global (or broader network level as in the case of an enterprise network) distributed ledger community, which includes remote system 11 in FIGS. 1, 2 and 4. Such participation allows for compliancy to those requirements while allowing for flexibility in brokering entry creation in support of service brokering at 31. Thus, the system may store the formatting requirements (protocol, rules, policy and/or templates) for each MDL in a database. For any MDL for which the system does not have stored formatting requirements, the gateway server may poll that MDL to request formatting requirements. It may then store those formatting requirements for use in future generations of ledger elements. As some ledger entries may need only portions of the exchange, certain elements may be written to different general ledger communities (as may be the case for auditing of bandwidth and storage resources). The MDL gateway 15 will use the MDL ontology to identify one or more remote MDLs that correspond to the requesting entity and/or to the service provider, and it will transmit a transaction lever for one or more elements of the service request to one or more of those MDLs.

For each remote MDL, a permission control and translation module 69 will establish and track the necessary elements of a ledger entry that would need to be recorded into the respective master ledgers of the global ledger community 11. The translation function of the permission control and translation module 69 ensures that the record adheres to the MDL formatting requirements of the remote MDL. For example, if the remote MDL is associated with the service providing device (or with a service provider to the service providing device, such as an accounting or payment system), the gateway server will ensure that the record matches (or is translated into) the remote MDL's required format. If the remote MDL is associated with the device that requested the service (or with a service provider to the requesting device)), the gateway server will apply an appropriate MDL formatting rule set (as obtained from the relational database 67) for the requesting entity to ensure that the record matches (or is translated into) the remote MDL's required format.

If more than one remote MDL needs to be updated, the gateway server may generate multiple transaction ledger elements. For example, it may use a MDL formatting template that is associated with the service providing resource to create a first transaction record for a first MDL, and it may use a MDL formatting template that is associated with the requesting device and its associated MDL to create a second transaction ledger element. It may then direct the first transaction ledger element to a remote MDL that is associated with the resource, and it may direct the second transaction ledger element to a remote MDL that is associated with the requesting device. At all times, the MDL gateway 15 may monitor and manage the flow of transactional information and the devices and resources involved are monitored and managed in a federated fashion based on service requirements acknowledged/provided during the process depicted in FIG. 3. By writing transaction ledgers to any number of MDLs and understanding which resources are performing the service elements, the system can help ensure that each resource's value transactions are recorded so they may be monetized (i.e., the resources rewarded) for their work in providing the service element. Optionally, any or all of the actions listed above may be accomplished by an integrated local server/gateway server device or system.

The resources as originally conscribed may need to be reallocated to conform to aspects of the service, this could be due to quality of service (QoS) or certain electromagnetic operational environment (EMOE) issues, by way of example. Any change may be included into the ledger of the transactions in anticipation or requirement of the value exchange obligated or intended upon commencement of the service. This dynamic ontology generation process and integration of network (defined to include all devices) transactional visibility supports the elasticity requirements of fixed, mobile and transient participation via managing and reporting of microtransactional granularity across all layers of networked services. This is a primary function of the transaction controller module 71 of the gateway server. If a service priority filter 75 determines that the assigned resource cannot or otherwise will not perform the requested service element (such as if the assigned resource cannot perform it within a specified parameter such as time, cost or quality of service), the filter 75 may direct the service element request to be reassigned. The reassignment 72 of supporting resources may be commanded by the gateway server but accomplished at the MDL interpreter 31 that originally established the resource brokering, using an assignment process such as was described above in the context of FIG. 3. In some embodiments, it may be desirable to avoid direct interaction from some devices such that access to key priority service hierarchy is maintained and allow only attested and authenticated network MDL interpreters to interface with the resources and devices. If, so, a security wall 73 may be included to maintain a signed ledger of activities and ensure that only authenticated network MDL interpreters are permitted to operate within the system.

Figure 5:
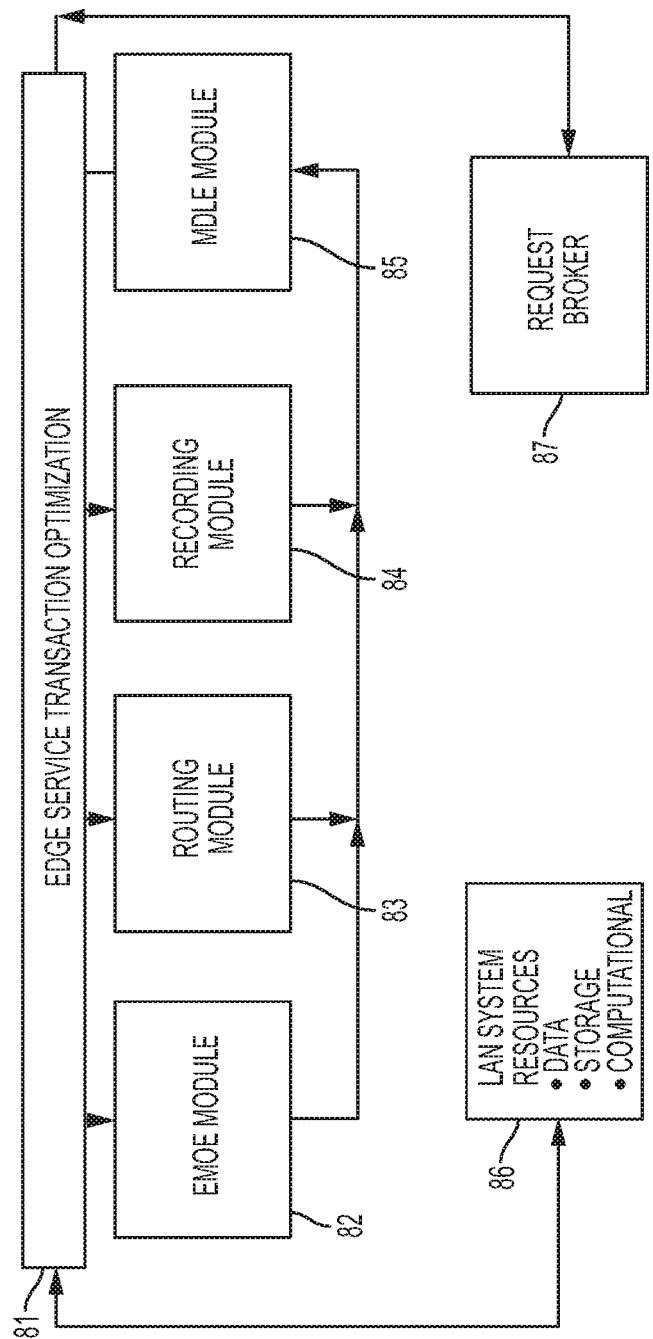
FIG. 5 illustrates an example application of the system of FIGS. 1-4.

FIG. 5 is a block diagram illustrating a potential application of the system described above in the context of FIGS. 1-4. The MDL interpreter server of WLAN (i.e., server 31 in FIGS. 1-4) may act as a request broker 87 that is configured to receive a request from a requesting device as described above. The local server may communicate with an edge service optimization system 81 that arranges for the local area network (LAN) resources 86 to provide the service. Examples of resources that may be used include data, storage devices (i.e., memory) and/or computational resources (i.e. processing devices). The edge service optimization system 81 also includes an electromagnetic operational environment (EMOE) module 82, a routing module 83, a recording module 84. The EMOE module 82 is configured to determine the wireless link physical and transport utilization that the service will require. The routing module 83 is configured to determine the amount of bandwidth and connection quality that the service will require. The recording module 84 is configured to create a record of the transaction in the form of a ledger or signed list. The mutual distributed ledger element (MDLE) module 85 represents functions that may be performed by a gateway server (element 15 in FIGS. 1-4) to add information to an appropriate blockchain, which may include local and/or external blockchains.

Figure 6:
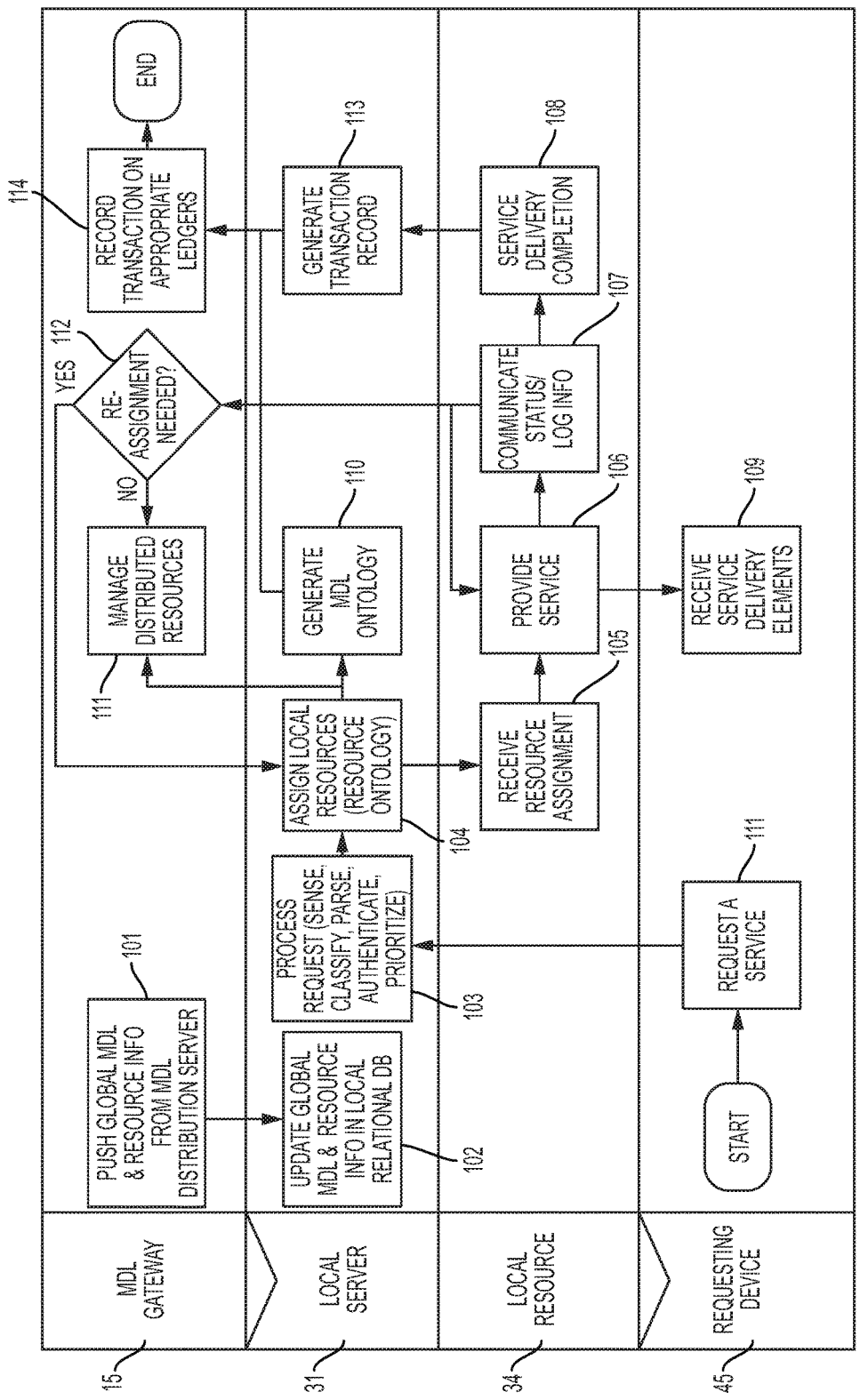
FIG. 6 depicts an example process flow of a method of managing distributed resources and recording transaction records for services provided by those resources.

FIG. 6 is a swimlane chart showing an example process flow for managing distributed resources and recording MDL ledgers for service elements that a resource may provide. In step 101, the MDL gateway server 13 may provide the local server 31 with information that the local server 31 can use to generate or update its database of global MDL and resource information (step 102). For example, the MDL gateway server 13 may push remote MDL information and local resource information that the MDL gateway server 13 receives from remote MDLs and resource devices, either directly or through one or more intermediate servers. When the local server 13 has an updated MDL and resource database, a requesting electronic device 45 that is communicating with the local server's service platform may submit a service request (step 121) to the local server 31. The local server 31 may authenticate the requesting device, and it may use the database information to process and prioritize the request (step 103). The local server 31 may use the database information to assign one or more resources to perform various elements of the service request (step 104), and for each resource that performs a service element the local server 31 may generate an MDL ontology (step 110) containing relationships between the resource, the requesting entity, and one or more remote MDLs.

For each resource that will perform a service element, the local server 31 will pass the MDL ontology to the gateway server, and it will pass the assignment to the resource 34 that will provide the service element. When the resource 34 receives the assignment (step 105), it may perform the service element (step 106) by providing the service element to the requesting entity (step 109) or to an intermediate entity such as the local server 31, which will in turn deliver the service to the requesting entity.

Before, during and/or after completing the service, the resource 34 may communicate its status to the gateway server (step 107). The gateway server 13 may manage distributed resources (step 111) by, among other things, using the status information to determine whether the assigned resource can provide the service element within a specified time frame, cost or resource budget, or other criteria. It may also compare (step 112) the anticipated performance characteristics and determine whether a different resource would provide the service in a preferred manner (such as more quickly or at a lower cost). If the comparison (step 112) indicates that an assignment will be preferable, the gateway server 13 may command the local server 31 to assign the service element to a different resource.

Upon completion of the service element (step 108), the resource 34 may notify the local server 31, which will generate a transaction record (step 113). The local server 31 will pass the transaction record to the gateway server 13. The gateway server 13 will use the MDL ontology and the transaction record to generate a transaction ledger that is formatted for the appropriate remote MDL, and it will record the transaction ledger on the appropriate MDL (step 114).

Figure 7:
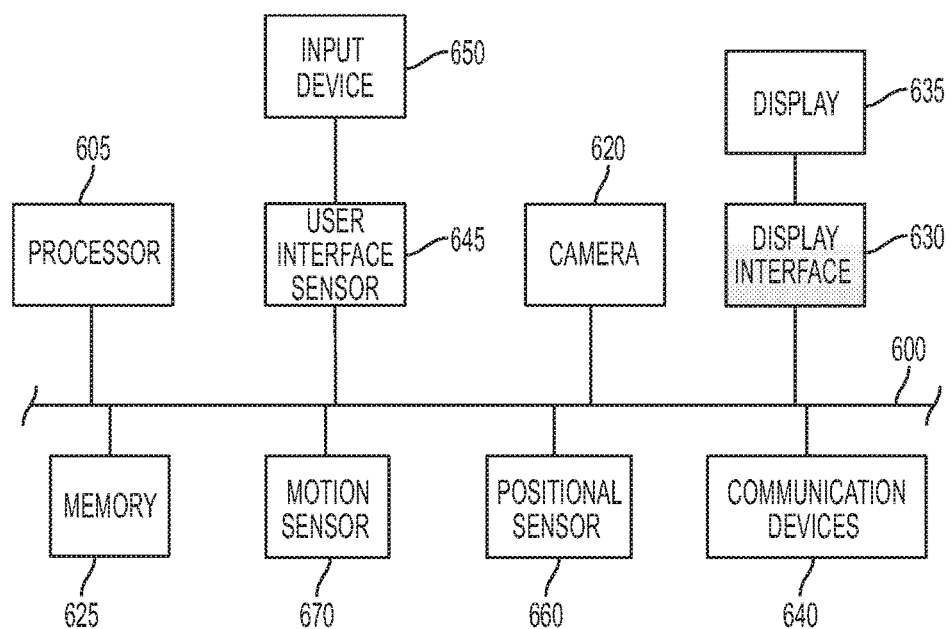
FIG. 7 depicts an example of internal hardware that may be included in any of the electronic components of the system.

FIG. 7 depicts an example of internal hardware that may be included in any of the electronic components of the system, such an IoT and/or other WLAN-connected device, or any of the servers in the system. An electrical bus 600 serves as an information highway interconnecting the other illustrated components of the hardware. Processor 605 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 625. A memory device may include a single device or a collection of devices across which data and/or instructions are stored.

An optional display interface 630 may permit information from the bus 600 to be displayed on a display device 635 in visual, graphic or alphanumeric format. An audio interface and audio output (such as a speaker) also may be provided. Communication with external devices may occur using various communication devices 640 such as a wireless antenna, an RFID tag and/or short-range or near-field communication transceiver, each of which may optionally communicatively connect with other components of the device via one or more communication system. The communication device 640 may be configured to be communicatively connected to a communications network, such as the Internet, a local area network or a cellular telephone data network.

The hardware may also include a user interface sensor 645 that allows for receipt of data from input devices 650 such as a keyboard, a mouse, a joystick, a touchscreen, a touch pad, a remote control, a pointing device and/or microphone. Digital image frames also may be received from a camera 620 that can capture video and/or still images. The system also may include a positional sensor 660 and/or motion sensor 670 to detect position and movement of the device. Examples of motion sensors 670 include gyroscopes or accelerometers. Examples of positional sensors 660 include a global positioning system (GPS) sensor device that receives positional data from an external GPS network.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method of managing requests on a wireless local area network, the method comprising:
 by a local server that is communicatively connected to a wireless local area network (WLAN), wherein the WLAN serves as a service platform and is connected to resources that comprise a plurality of types of electronic devices and the local server functions as an edge server for communications between the WLAN and a remote gateway:
  receiving a service request from a first electronic device, wherein the first electronic device is a wireless electronic device that is connected to the WLAN,
  parsing the service request to identify one or more service elements that are needed to fulfill the service request,
  using a resource ontology to select, from the resources that are connected to the WLAN, a resource electronic device that is capable of providing at least one of the service elements, transmitting an assignment to the resource electronic device to provide the at least one of the service elements, generating a transaction record that includes a record of the service request, identifying a mutual distributed ledger (MDL) ontology comprising identification information or parameters for one or more remote MDLs that correspond to the first electronic device or the resource electronic device, and transmitting the transaction record and the MDL ontology to a gateway server; and by the gateway server that is communicatively connected to the WLAN:

determining that the resource electronic device has provided the at least one of the service elements;

using the MDL ontology to identify a remote MDL, using the transaction record to generate a transaction ledger for the at least one of the service elements, wherein the transaction ledger has a format that corresponds to formatting requirements of the remote MDL, and transmitting the transaction ledger to the remote MDL.

2. The method of claim 1, wherein identifying, by the gateway server, the remote MDL comprises identifying a remote MDL that is associated with the resource electronic device.

3. The method of claim 1, wherein identifying, by the gateway server, the remote MDL comprises identifying a MDL that is associated with the first electronic device.

4. The method of claim 2, further comprising, by the gateway server:

identifying a second remote MDL that is associated with the first electronic device, and generating a second transaction ledger record for the service request according to a formatting requirement of the second remote MDL; and transmitting the second transaction ledger to the second remote MDL.

5. The method of claim 1, further comprising, by the resource electronic device:

providing the at least one of the service elements to the first electronic device to provide the service; and transmitting a transaction confirmation to the gateway server.

6. The method of claim 1, further comprising, by the local server:

receiving, from the resource electronic device, the at least one of the service elements;

passing the at least one of the service elements to the first electronic device to provide the service; and transmitting a transaction confirmation to the gateway server in the transaction record.

7. The method of claim 1, further comprising:

by the local server:

identifying an additional one of the resources that can provide an additional one of the service elements, transmitting an assignment to the additional resource to provide the additional service element, and transmitting an additional transaction confirmation to the gateway server; and by the gateway server, using the additional transaction confirmation to generate an additional transaction ledger that is formatted in accordance with the identified remote MDL.

8. The method of claim 1, further comprising:

by the local server:

identifying an additional one of the resources that can provide an additional one of the service elements, and an additional MDL for the additional resource, transmitting an assignment to the additional resource to provide the additional service element, and transmitting an additional transaction confirmation to the gateway server; and by the gateway server, confirming that the additional service element has been provided, using the MDL ontology to identify an additional remote MDL, and using the additional transaction confirmation to generate an additional transaction ledger that is formatted in accordance with the additional remote MDL.

9. The method of claim 1, wherein the resource electronic device is a second wireless electronic device that is connected to the WLAN.

10. The method of claim 1, wherein generating the transaction ledger for the request comprises generating a permissioned distributed ledger element that includes:

a resource ID for the resource electronic device; and one or more of the following:

a measurement of an amount of utilization of the resource electronic device, or a quality of service metric.

11. The method of claim 1, further comprising, by the gateway server:

determining that the resource electronic device will not provide the at least one of the service elements; and transmitting, to the local server, a command to reassign the at least one of the service elements to a different resource.

12. A system for managing requests on a wireless local area network, the system comprising:

a gateway server that is communicatively connected to a plurality of remote mutual distributed ledgers (MDLs); and a local server that is communicatively connected to the gateway server and to a wireless local area network (WLAN), wherein the WLAN serves as a service platform and is connected to resources that comprise a plurality of types of electronic devices, and the local server comprises a memory and programming instructions that are configured to cause the local server to:

receive a service request from a first electronic device, wherein the first electronic device is a wireless electronic device that is connected to the WLAN, parse the service request to identify one or more service elements that are needed to fulfill the service request, select, from the resources that are connected to the WLAN, a resource electronic device that is capable of providing at least one of the service elements, transmit an assignment to the resource electronic device to provide the at least one of the service elements, generate a transaction record that includes a record of the service request, identify a MDL ontology comprising identification information or parameters for one or more remote MDLs that correspond to the first electronic device or the resource electronic device, determine that the resource electronic device has provided the at least one of the service elements, and transmit the transaction record and the MDL ontology to the gateway server; and wherein the gateway server also comprises programming instructions that are configured to cause the gateway server to:
use the MDL ontology to identify a remote MDL,
use the transaction record to generate a transaction ledger for the at least one of the service elements, wherein the transaction ledger has a format that corresponds to formatting requirements of the remote MDL, and
transmit the transaction ledger to the remote MDL.

13. The system of claim 12, wherein the programming instructions to identify, by the gateway server, a remote MDL comprise instructions to identify a remote MDL that is associated with the resource electronic device.

14. The system of claim 12, wherein the programming instructions to identify, by the gateway server, a remote MDL comprise instructions to identify a remote MDL that also is associated with the first electronic device.

15. The system of claim 12, further comprising additional programming instructions that are configured to cause the gateway server to:
identify a second remote MDL that is associated with the first electronic device;
generate a second transaction ledger for the service request according to formatting requirements of the second remote MDL; and
transmit the second transaction ledger to the second remote MDL.

16. The system of claim 12, wherein the programming instructions that are configured to cause the gateway server to generate the transaction ledger comprise instructions to do so upon receipt of a transaction confirmation from the resource electronic device.

17. The system of claim 12, further comprising additional instructions that are configured to cause the local server to:
receive, from the resource electronic device, confirmation that the at least one of the service elements has been provided; and
transmit a transaction confirmation to the gateway server with the transaction record.

18. The system of claim 12, further comprising:
additional instructions that are configured to cause the local server to:
identify an additional one of the resources that can provide an additional one of the service elements,
transmit an assignment to the additional resource to provide the additional service element,
determine that the additional resource has provided the additional service element, and
transmit an additional transaction confirmation to the gateway server; and
additional instructions that are configured to cause the gateway server to use the additional transaction confirmation to generate an additional transaction ledger.

19. The system of claim 12, further comprising:
additional instructions that are configured to cause the local server to:
identify an additional one of the resources that can provide an additional one of the service elements,
transmit an assignment to the additional resource to provide the additional service element,
confirm that the additional resource has provided the additional service element,
transmit an additional transaction confirmation to the gateway server; and
additional instructions that are configured to cause the gateway server to:
identify an additional remote MDL for the additional service element, and
use the additional transaction confirmation to generate an additional transaction ledger that is formatted in accordance with the additional MDL.

20. The system of claim 12, further comprising the resource electronic device, wherein the resource electronic device is a component of the service platform.

21. The system of claim 12, wherein the programming instructions that are configured to cause the gateway server to generate the transaction ledger for the request comprise instructions to generate a permissioned distributed ledger element that includes:
a resource ID for the resource electronic device; and
one or more of the following:
a measurement of an amount of utilization of the resource electronic device, or
a quality of service metric.

22. The system of claim 12, further comprising additional programming instructions that are configured to cause the gateway server to:
determine that the resource electronic device will not provide the at least one of the service elements; and
transmit, to the local server, a command to reassign the at least one of the service elements to a different resource.

* * * * *